US010546038B2

(12) United States Patent
Karppanen

(10) Patent No.: US 10,546,038 B2
(45) Date of Patent: Jan. 28, 2020

(54) INTELLIGENT BROWSER-BASED DISPLAY TILING

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 14/563,831

(22) Filed: Dec. 8, 2014

(65) Prior Publication Data
US 2016/0162597 A1 Jun. 9, 2016

(51) Int. Cl.
G06F 17/30 (2006.01)
G06F 16/957 (2019.01)
G06F 3/0484 (2013.01)

(52) U.S. Cl.
CPC ........ *G06F 16/9577* (2019.01); *G06F 3/0484* (2013.01); *G09G 2360/122* (2013.01)

(58) Field of Classification Search
CPC ............. G06F 17/211; G06F 17/30905; G06F 3/0485; G06F 3/0484; G09G 2360/122
See application file for complete search history.

(56) References Cited

U.S. PATENT DOCUMENTS

| 6,061,715 A | 5/2000 | Hawes | |
| 7,051,084 B1 * | 5/2006 | Hayton | G06F 17/3089 707/E17.116 |
| 7,627,648 B1 | 12/2009 | Mehta et al. | |
| 7,975,019 B1 * | 7/2011 | Green | G06Q 30/0241 705/14.4 |
| 8,103,742 B1 * | 1/2012 | Green | G06F 17/30893 709/218 |
| 8,200,896 B2 | 6/2012 | Schmieder et al. | |
| 8,311,900 B1 * | 11/2012 | Bates | G06F 17/30905 705/27.1 |

(Continued)

OTHER PUBLICATIONS

International Search Report and Written Opinion in PCT Application No. PCT/US15/64234 dated Feb. 11, 2016, 12 pages.

(Continued)

*Primary Examiner* — Maikhanh Nguyen
(74) *Attorney, Agent, or Firm* — Knobbe, Martens, Olson & Bear, LLP

(57) ABSTRACT

Features are disclosed for dividing content pages into sections, or "tiles," that can be updated independently of one another, and determining the processing burdens associated with updating and managing such divided content pages, the likelihood that portions of the content pages will change, etc. The processing burdens may be based on an analysis of how long it takes to update the display of the tiles or other sections of the content page, the computer memory used to update the display, the processor cycles used to update the display, etc. A browser application or some other module can use the determined processing burdens and/or change likelihoods to define a new or updated layout for dividing the content pages into tiles. The browser application may also cache, for future use, cost information and/or information regarding the new or updated layout for dividing the content pages into tiles.

20 Claims, 5 Drawing Sheets

(56) References Cited

U.S. PATENT DOCUMENTS

| | | | |
|---|---|---|---|
| 8,453,148 B1 | 5/2013 | Hobbs | |
| 8,754,827 B2* | 6/2014 | Braghis | G06F 3/1454 |
| | | | 345/1.3 |
| 8,943,197 B1* | 1/2015 | Taylor | G06F 17/2247 |
| | | | 709/224 |
| 9,075,893 B1* | 7/2015 | Jenkins | G06F 17/30902 |
| 9,177,534 B2* | 11/2015 | Jeganathan | G09G 5/395 |
| 9,383,917 B2* | 7/2016 | Mouton | G06F 3/04883 |
| 9,596,314 B1 | 3/2017 | Eldawy | |
| 9,785,332 B1* | 10/2017 | Karppanen | G06F 3/0485 |
| 2001/0032238 A1* | 10/2001 | Cronin, III | G06F 17/30905 |
| | | | 709/203 |
| 2002/0029285 A1 | 3/2002 | Collins | |
| 2003/0025716 A1 | 2/2003 | Colavin | |
| 2003/0046365 A1* | 3/2003 | Pfister | G06F 17/30902 |
| | | | 709/219 |
| 2003/0158916 A1* | 8/2003 | Cronin, III | G06F 17/30905 |
| | | | 709/219 |
| 2004/0095400 A1* | 5/2004 | Anderson | G06F 17/30905 |
| | | | 715/864 |
| 2004/0135784 A1 | 7/2004 | Cohen et al. | |
| 2005/0243097 A1 | 11/2005 | Cohen et al. | |
| 2005/0270299 A1* | 12/2005 | Rasmussen | G01C 21/32 |
| | | | 345/552 |
| 2006/0064467 A1* | 3/2006 | Libby | G06F 17/30905 |
| | | | 709/217 |
| 2006/0277478 A1* | 12/2006 | Seraji | G06F 3/0481 |
| | | | 715/760 |
| 2007/0252834 A1* | 11/2007 | Fay | G06T 3/4092 |
| | | | 345/428 |
| 2008/0055623 A1 | 3/2008 | Piersol et al. | |
| 2008/0133647 A1 | 6/2008 | Hamzeh | |
| 2008/0181498 A1 | 7/2008 | Swenson et al. | |
| 2008/0222273 A1* | 9/2008 | Lakshmanan | G06F 17/30247 |
| | | | 709/219 |
| 2009/0033986 A1 | 2/2009 | Himpe | |
| 2009/0089448 A1 | 4/2009 | Sze et al. | |
| 2009/0125799 A1* | 5/2009 | Kirby | G06F 17/30899 |
| | | | 715/234 |
| 2009/0307428 A1* | 12/2009 | Schmieder | G06F 3/1462 |
| | | | 711/118 |
| 2010/0020091 A1* | 1/2010 | Rasmussen | G01C 21/32 |
| | | | 345/582 |
| 2010/0115056 A1 | 5/2010 | Tuli | |
| 2010/0115454 A1 | 5/2010 | Tuli | |
| 2010/0281402 A1* | 11/2010 | Staikos | G06F 17/30899 |
| | | | 715/760 |
| 2011/0004828 A1* | 1/2011 | Callicrate | G06F 16/29 |
| | | | 715/738 |
| 2011/0029904 A1 | 2/2011 | Smith et al. | |
| 2011/0074765 A1 | 3/2011 | Oterhals et al. | |
| 2011/0080955 A1 | 4/2011 | Shi et al. | |
| 2011/0207446 A1* | 8/2011 | Iwuchukwu | H04L 67/325 |
| | | | 455/414.3 |
| 2011/0231746 A1 | 9/2011 | Rohrabaugh et al. | |
| 2011/0258532 A1* | 10/2011 | Ceze | G06F 17/30902 |
| | | | 715/234 |
| 2012/0001832 A1* | 1/2012 | Braghis | G06F 3/1454 |
| | | | 345/2.2 |
| 2012/0047444 A1 | 2/2012 | Adar et al. | |
| 2012/0110435 A1* | 5/2012 | Green | G06F 17/30893 |
| | | | 715/234 |
| 2012/0151308 A1 | 6/2012 | Falkenberg | |
| 2012/0188280 A1* | 7/2012 | Charlebois | G06T 3/40 |
| | | | 345/634 |
| 2012/0254721 A1 | 10/2012 | Jain et al. | |
| 2012/0254780 A1 | 10/2012 | Mouton et al. | |
| 2012/0256949 A1 | 10/2012 | Treat et al. | |
| 2012/0260157 A1 | 10/2012 | Zhu et al. | |
| 2012/0265802 A1 | 10/2012 | Shen et al. | |
| 2013/0145259 A1 | 6/2013 | Kiefer, III et al. | |
| 2013/0219024 A1 | 8/2013 | Flack | |
| 2014/0059421 A1* | 2/2014 | Chibisov | G06F 17/2247 |
| | | | 715/234 |
| 2014/0136942 A1* | 5/2014 | Kumar | G06F 17/30902 |
| | | | 715/229 |
| 2014/0136951 A1* | 5/2014 | Kumar | G06F 17/30902 |
| | | | 715/234 |
| 2014/0136971 A1* | 5/2014 | Kumar | G06F 17/30902 |
| | | | 715/273 |
| 2014/0136973 A1* | 5/2014 | Kumar | G06F 17/30902 |
| | | | 715/274 |
| 2014/0173520 A1* | 6/2014 | Sheha | G06Q 30/02 |
| | | | 715/834 |
| 2014/0189487 A1 | 7/2014 | Kwan et al. | |
| 2014/0267336 A1* | 9/2014 | Jeganathan | G09G 5/395 |
| | | | 345/545 |
| 2015/0026566 A1 | 1/2015 | Hui et al. | |
| 2015/0089355 A1* | 3/2015 | Peng | G06F 3/048 |
| | | | 715/244 |
| 2015/0229569 A1 | 8/2015 | Hui et al. | |
| 2015/0293929 A1 | 10/2015 | Namgung | |
| 2015/0310126 A1 | 10/2015 | Steiner et al. | |

OTHER PUBLICATIONS

Ranganathan et al., "A Lossless Image Compression Algorithm Using Variable Block Size Segmentation", IEEE Transactions on Image Processing, Oct. 1995, vol. 4, No. 10, pp. 1396-1406.

Vaisey et al., "Image Compression with Variable Block Size Segmentation", IEEE Transactions on Signal Processing, Aug. 1992, vol. 40, No. 8, pp. 2040-2060.

\* cited by examiner

INTELLIGENT BROWSER-BASED DISPLAY TILING

BACKGROUND

Network content browser applications (also referred to simply as "browsers") obtain and display network content, such as content pages and other network-accessible files. Content pages typically include multiple visual elements, such as text, images, videos, interactive controls, and the like. The visual representation of any or all of the elements may change after the content page is initially displayed. For example, text may dynamically change in response to user-initiated events, video or animations may progress frame-by-frame, users may enter information into and otherwise interact with various controls, and so on. In response to determining that a visible change is to be applied to an element, the browser can re-draw the content page to the display of the user device to reflect the desired visible change to the element.

Some browser applications reduce the time and computing resources required to update the display of content page by dividing the content page into portions that can be independently updated. For example, a browser may divide a content page into a plurality of rectangular tiles, each of which corresponds to a different portion of the visible content page. As user interactions, animations, script executions, and other types of events cause the appearance of individual elements on the content page to change, the tile or tiles on which the elements are displayed become "damaged." Rather than updating the entire display, the browser may only update the damaged tiles. For example, if a device can display 100 tiles at a given time, and an element with a pending visual change is displayed on only three of those tiles, the browser only needs to re-draw the three tiles that include some portion of the element. Thus, the browser can avoid re-drawing 97 out of 100 tiles while still ensuring that the display of the content page is updated.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
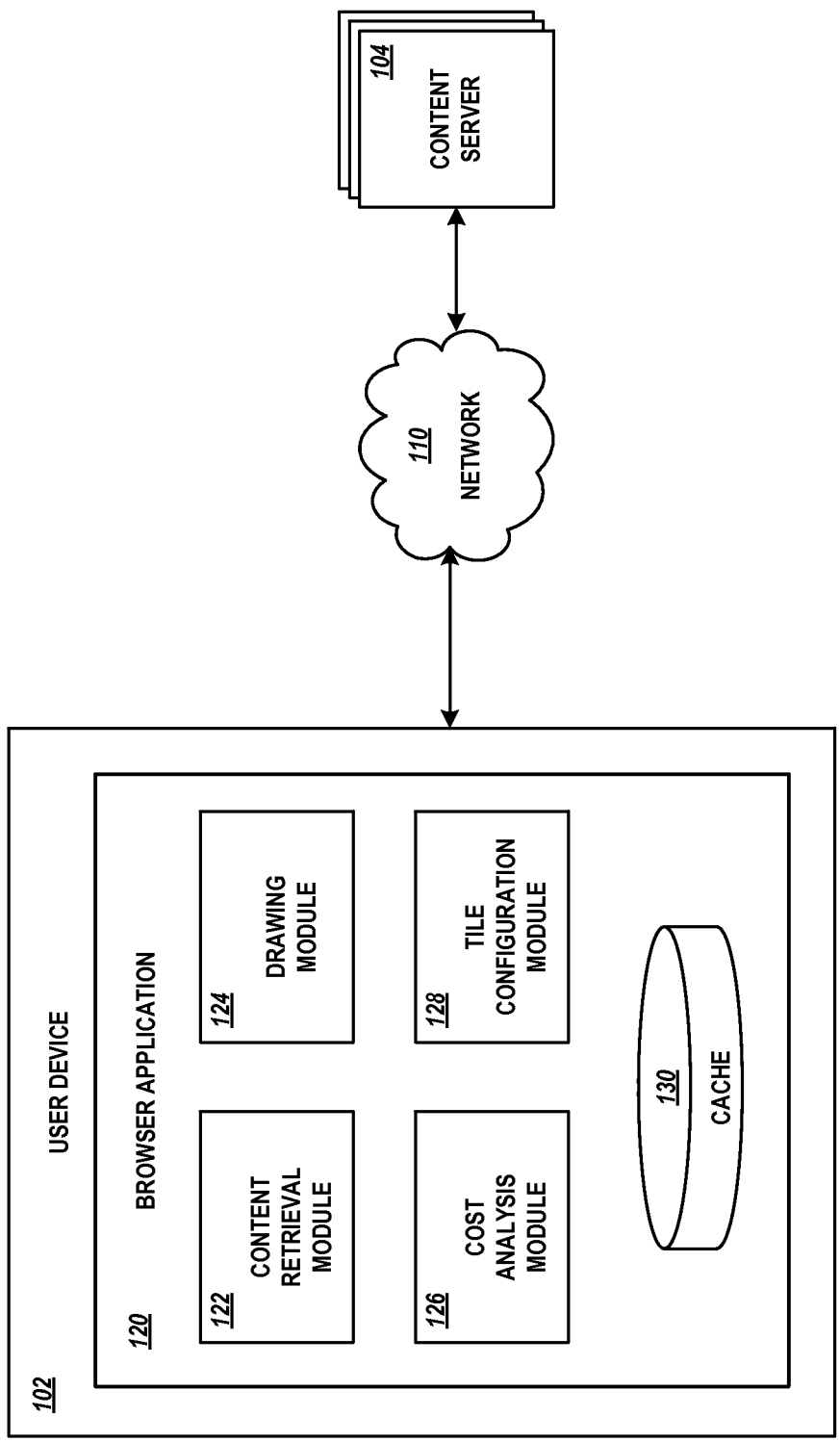
FIG. 1 illustrates a computing device with a browser application that implements intelligent display tiling according to some embodiments.

The present disclosure relates to a network content browser application that intelligently separates the display of network content into "tiles" or other sections that can be efficiently updated to change the display of portions of the content page. In some embodiments, the network content browser application (also referred to as a "browser application" or "browser") can separate the display of content pages into tiles based on an analysis of whether the visual display of individual elements on the content page will change, the time and resources required to draw an updated visual display of the elements, and/or other factors. For example, the browser may group substantially static areas of a page into a single large tile while separating more dynamic areas into multiple smaller tiles. Thus, updates to individual dynamic areas can be performed efficiently without affecting other areas of the display, while the large static tile can also be efficiently managed as a single unit.

As used herein, the term "drawing" is used according to its ordinary meaning known to those of skill in the relevant art, and refers generally to the process of determining which shapes, colors, textures and the like to display on an output device of a computing device, and further refers to the process of causing display of the determined shapes, colors, textures, etc. Some conventional browsers separate the display of content pages into a grid or matrix of similar or identically-sized and shaped tiles that can be drawn (or re-drawn) independent of one another. Thus, updates to the display of individual elements on the content page can be performed by re-drawing only the tiles on which the elements are found. However, because the tiles are typically identically-sized rectangles, other content that may not have changed visually is included on the tiles that are re-drawn. For example, an entire tile may be re-drawn even though an element that covers only a small portion of the tile has changed visually. When display of an element is spread across multiple (e.g., two or more) tiles, the inefficiencies of re-drawing an entire tile to update only a portion thereof is extended to re-drawing multiple tiles to update only portions of the individual tiles. In addition, the separate management (e.g., tracking of changes, memory management, etc.) of multiple individual tiles that are typically updated together is a further cause of inefficiency.

Some aspects of the present disclosure relate to recording information about the processing burden or "cost" of drawing various areas of a content page, and using the information to adjust the manner in which a content page is divided into tiles. When a browser application obtains and draws content to a computing device display, the browser may record information regarding the cost of drawing portions of the content item (e.g., a measurement of resources used, such as processor cycles used, memory used, time elapsed, etc.). In some embodiments, the browser application may initially render a page using a default matrix or grid of similar or identically-sized and shaped tiles. The browser application may record the time taken to draw each individual tile. The browser application may also determine the individual content elements that are in the tiles, whether the elements are expected to be visually static or dynamic, whether the elements cross tile boundaries, etc. Such information can be used to determine the likelihood that an element will become "damaged" (e.g., the state of the element has changed and the visual display no longer reflects the current state of the element) and be re-drawn, and the cost to do so. For example, the likelihood can be determined based on an analysis of when and how often individual tiles become damaged and get redrawn, which tiles tend to become damaged at the same time or in response to the same events, etc. As another example, the likelihood can be based on the type of each content element (e.g., video content and animations are very likely to change), by executing scripts on the page and monitoring how those scripts affect the display of the page, etc. In some embodiments, one or more machine learning models or algorithms may be used to make such determinations. The browser can determine an optimal or otherwise more efficient tiling scheme for the content page based on the predicted changes and costs. For example, if a dynamic element crosses the boundary between two tiles, the two tiles can be combined into a single tile. In addition, if the dynamic element does not take up all or a threshold amount of space in the combined tile, the tile may be re-shaped in an irregular manner such that the tile completely or substantially corresponds to the size and/or shape of the element. In this way, the browser may manage and re-draw the tile as needed, without inefficiently managing and re-drawing other elements that do not change visually at the same time as the primary element.

Additional aspects of the present disclosure relate to the layering of tiles. When a browser application obtains and renders content for display, the browser may determine that a particular element or portion of the page may move or otherwise expose an underlying element or portion of the page. The browser may determine that the cost of re-drawing the underlying element or portion is great enough that it is an efficient use of the finite memory space available to the browser to retain the underlying element or portion in memory (e.g., it would take relatively long time to draw the underlying element, or the underlying element is expected to be "uncovered" or otherwise shown often). Thus, when the overlapping portion moves or otherwise exposes the underlying portion, the underlying portion may be immediately displayed from memory rather than being re-drawn. In some embodiments, the browser may provide such functionality by defining multiple (e.g., two or more) overlapping layers of content, rather than simply separating the display of the content page into tiles according to a single two-dimensional grid.

Further aspects of the present disclosure relate to caching or otherwise storing information regarding the costs associated with re-drawing content elements, improved tiling configurations for individual content pages, and the like. The browser application may store cost and/or other tiling information for a given content page such that the information may be used by the browser to efficiently update the display of the page. For example, cost information or tiling information may be stored in (or in association with) the document object model ("DOM") that defines the content page in memory. In addition, tiling information may be cached for use in processing the page in a different browsing session or on a different client device. For example, a browser application may execute on a server system that acts as an intermediary between client devices and content servers. The browser application may cache tiling information, cost information, and the like, and may access and use such information responsive to subsequent requests for the content item received from the same computing device or from a different computing device.

Although aspects of the embodiments described in the disclosure will focus, for the purpose of illustration, on example costs and tiling configurations for content pages, one skilled in the art will appreciate that the examples are illustrative only, and are not intended to be limiting. In some embodiments, other costs, tiling configurations, etc. may be used instead of or in addition to those disclosed herein. Various aspects of the disclosure will now be described with regard to certain examples and embodiments, which are intended to illustrate but not limit the disclosure.

System Components

FIG. 1 illustrates an example network environment in which features can be implemented for processing content pages, determining costs associated with updating portions of the content pages, and determining tiling configurations using the determined costs. The network environment shown in FIG. 1 includes a user device 102 in communication with various content servers 104, such as origin content servers and content delivery network ("CDN") servers, via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The user device 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

The user device 102 may implement features described herein in hardware, or in a combination of hardware and software. In some embodiments, the user device 102 may include one or more processors that execute a browser application 120 to retrieve, process, and display network content on the user device 102 (or a display component associated with the user device 102). As shown, the browser application 120 may include various modules and data stores, including: a content retrieval module 102 to request and receive content pages; a drawing module 124 to process and display content pages; a cost analysis module 126 to analyze information about portions of the content page and determine the expected cost of re-drawing the portions; a tile configuration module 128 to determine an optimized or otherwise improved tiling configuration for the content page; a cache 130 to store content items, cost information, tiling configuration information; and the like. In some embodiments, some or all of the modules shown in FIG. 1 and/or the features described herein may be implemented by a browser module that is not a stand-alone browser application. For example the browser module may be an add-on, extension, or some stand-alone application that is separate from a browser.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from user devices 102 or other devices or service providers. In some embodiments, one or more content servers 106 may be associated one or more CDN service providers (e.g., entities that manage multiple CDN servers), application service providers, etc.

In some embodiments, cost analysis, tile configuration, and other related features described herein may be implemented by a server-side browser application. For example, a server system may act as an intermediary between user devices and content servers, and may retrieve, process, and render content using a server-side browser application. The server system can provide representations of the processed content (e.g., images, executable graphics commands, remote desktop protocol or "RDP" representations, etc.) to client-side browser applications executing on user devices. The client-side browser applications can then can display the representations of the content received from the server system, and facilitate user interactions with the content, obtain updated representations form the server system responsive to user interactions and other events, etc. Examples of intermediary server systems that execute server-side browser applications that process and transmit representations of content to client-side browser applications are disclosed in U.S. patent application Ser. No. 13/174,589, titled "Remote Browsing Session Management" and filed on Jun. 30, 2011, and U.S. patent application Ser. No. 14/285,477, titled "Distributed Content Browsing System Using Transferred Hardware-Independent Graphics Commands" and filed on May 22, 2014, the contents of both of which are incorporated by reference herein.

Process for Determining and Updating Content Tiling Configuration

Figure 2:
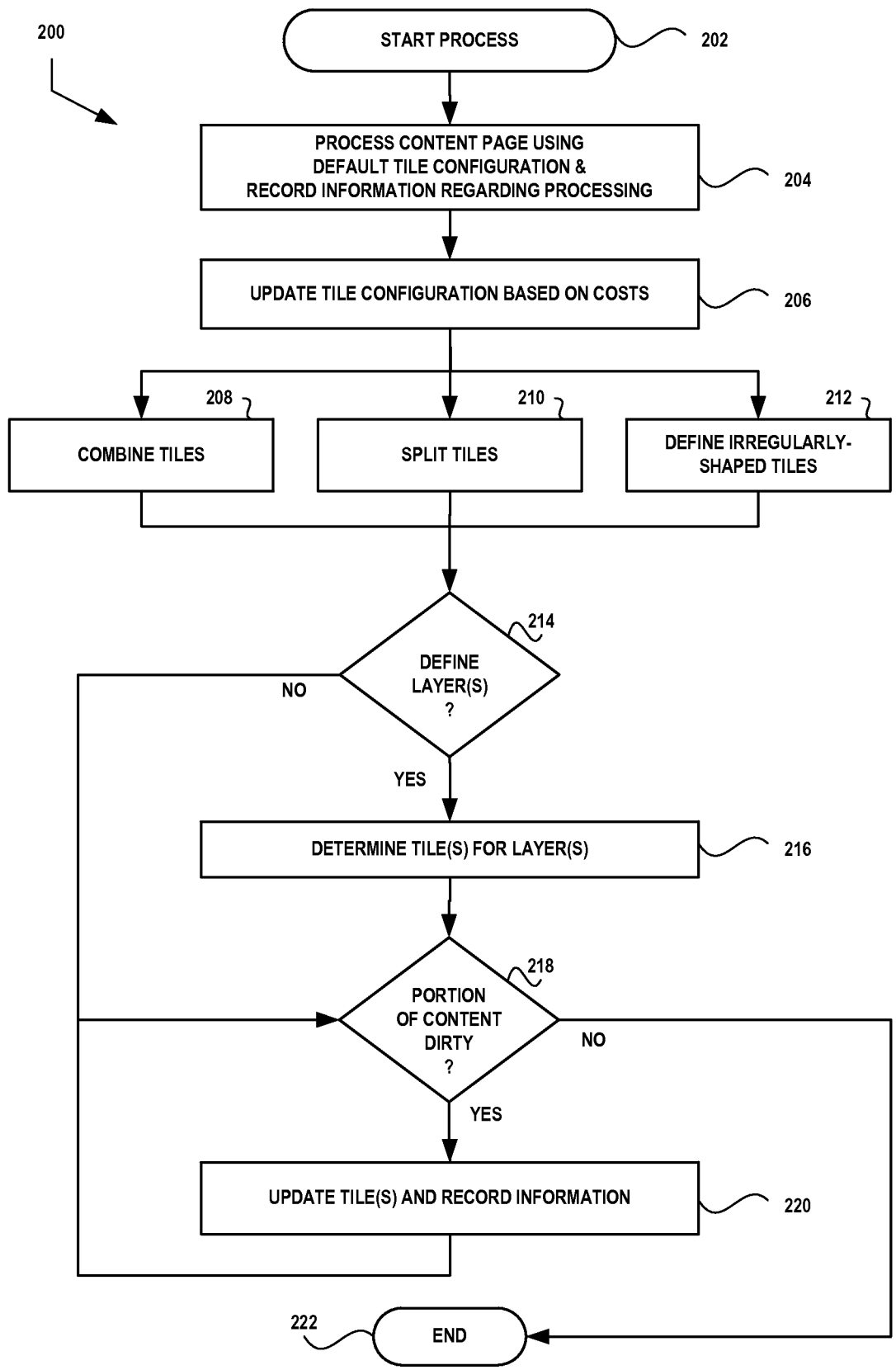
FIG. 2 is a flow diagram of an illustrative process for implementing intelligent display tiling according to some embodiments.

FIG. 2 is a flow diagram of a process 200 for determining and updating content tiling configurations. Advantageously, a browser may use the process 200 to determine the cost associated with updating various portions of content, keeping portions of the content in memory even when not displayed, etc. The browser can use the determined costs to generate an intelligent configuration of content tiles that provides more efficient use of computing resources and overall better user-perceived performance than, e.g., a grid of identically-shaped and sized tiles. Although the process 200 will be described below as being implemented in its entirety by a browser application 120 executed by a user device, in some embodiments the process 200 (or portions thereof) may be implemented by a server-side browser application, as described in greater detail below with respect to FIGS. 4 and 5.

The process 200 begins at block 202. The process 200 may begin automatically, such as in response to some event. For example, the process 200 may begin in response to receipt of a content page from one or more content servers 106. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various external objects and including network addresses of servers from where the external objects may be obtained. The content retrieval module 122 or some other module or component of the browser 120 may parse the base resource, identify embedded resources, and retrieve the embedded resources from the appropriate source(s).

Figure 3:
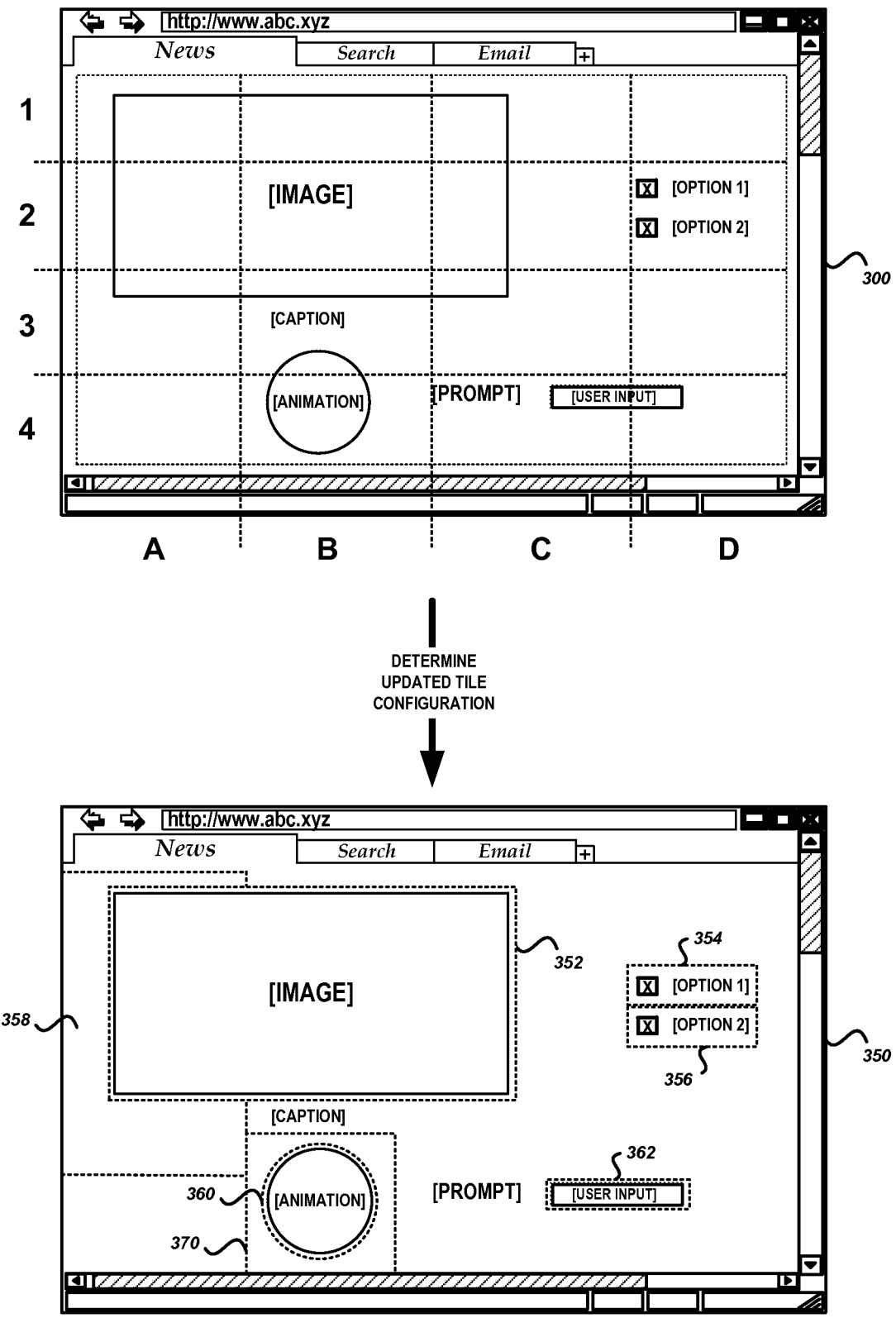
FIG. 3 is a diagram of an illustrative user interface with intelligent display tiling according to some embodiments.

At block 204, the browser 120 can process and draw the content page in a grid of tiles, and record information about the content page and the process of drawing the individual tiles, such as information about the processing burden to draw the individual tiles, including the resources used (e.g., memory used, CPU cycles used, amount of time elapsed, etc.). In some embodiments, the drawing module 124 or some other module or component of the browser 120 can draw the content page on a grid of similar or identically-sized and shaped tiles, such as a grid of rectangles. FIG. 3 shows an example browser interface 300 displaying a content page rendered using a grid of rectangular tiles. To draw the content page within the browser interface 300, the drawing module 124 may identify, for each tile of the content page to be displayed, individual objects, shapes, colors, textures, and the like from a render tree for the content page (e.g., a data structure created by applying styles and layouts to the DOM tree for the content page). The drawing module 124 may draw the appropriate tile and record information about the drawing process, such as how long it took to draw the tile, which elements from the content page are displayed in the tile, specific properties of those elements (e.g., dynamic formatting), and the like. The drawing module 124 can record such information for use by the cost analysis module 126 in determining the cost associated with re-drawing the entire tile, individual elements of the content page, etc.

In some embodiments, the browser 120 can keep data regarding groups of tiles that become damaged together while the content page is displayed and/or interacted with (e.g., tiles which tend to become damaged contemporaneously, in response to the same events, etc.). Two or more tiles (or portions thereof) can be combined together upon determining that they typically become damaged together (or rarely become damaged). In some embodiments, tiles may be split into sub-tiles for damage tracking purposes (e.g., four separate tiles corresponding to the four tile quadrants, nine tiles corresponding to three rows and three columns of mini-tiles, sub-tiles for each individual pixel or group of pixels, etc.). The browser 120 can then determine which portions of a tile become damaged independently of other portions of a tile by tracking which sub-tiles become damaged, when they become damaged, and the like. The browser 120 can then separate a tile into multiple tiles corresponding to the groups of sub-tiles or individual sub-tiles that become damaged contemporaneously or in response to the same events. In some embodiments, damage history information regarding neighboring tiles/sub-tiles may be checked to identify tiles/sub-tiles that either tend to become damaged together or that tend to not become damaged. Such neighboring tiles may then be combined into a single tile, as described below.

At block 206, the browser 120 can alter the current tiling configuration or generate an updated tiling configuration for the content page based on the costs associated with re-drawing portions of the content page and/or the damage history of the portions of the content page. FIG. 3 shows an example browser interface 350 displaying a content page using an updated tiling configuration. In some embodiments, the tile configuration module 128 or some other module or component of the browser 120 can use a machine learning model trained to determine the cost of re-drawing individual portions of the content page based on, e.g., the time it takes the drawing module 124 to draw a representation of the portion for display, the frequency with which the portion is expected to become "damaged" (e.g., determined to require a change to the visual representation of the portion), etc. For example, the tile configuration module 128 can combine multiple (e.g., two or more tiles) into a single tile to reduce management costs (e.g., monitor for changes, make decisions about whether to re-draw or remove from memory, etc.), as described below with respect to block 208. As another example, the tile configuration module 128 can split a tile into multiple (e.g., two or more) separate tiles to reduce the amount content to be re-drawn when an element on a portion of a tile becomes damaged, as described below with respect to block 210. As a further example, the tile configuration module 128 can generate an irregularly-shaped tile (e.g., a non-rectangular tile) that corresponds to the shape of a particular element, thus reducing the amount of content to be re-drawn when an element on a portion of a tile becomes damaged, as described below with respect to block 212

At block 208, the browser 120 can combine two or more tiles (or portions thereof) into a single tile. Combining tiles into a smaller number of tiles can reduce the overhead involved in managing the tiles of a content page. For example, the browser 120 typically monitors the various elements and other portions of the content page to determine when the visual displays of the portions are to be updated. In addition, the browser 120 identifies the tiles that are to be displayed during/after scrolling events, panning events, zooming events, and the like. Many content pages include areas that remain substantially static, such as areas of background with no overlapping content, areas with static text, and the like. By defining a single or small number of tiles to correspond to such substantially static areas, the overall management overhead can be reduced. The interfaces 300, 350 of FIG. 3 illustrate an example of combining substantially static areas of a content page into a single tile. As shown, tiles A1, A2, A3, B1, B2, B3, C1, C2, and C3 (or substantial portions thereof) from interface 300 have been combined into a single tile 352, corresponding to an image, in the browser interface 350 that is using the updated tiling configuration. The tile configuration module 128 has determined that the image is most efficiently handled as a single tile because, e.g., it is substantially static, and when it does require updating, the entire image is typically updated (e.g., replaced with a different image).

In some cases, portions of a dynamic element (e.g., text with dynamic formatting, animations, and the like) may be present on two or more different tiles. For example, a dynamic element may cross a boundary between adjacent tiles. FIG. 3 illustrates an example of an input text box crossing the boundary between tiles C4 and D4 in interface 300. The tile configuration module 128 may determine that such an element is dynamic in nature and is therefore likely to change visually (in this case, the element exists to be changed through entry/editing of text displayed therein). Rather than requiring two different tiles to be updated each time the text box is updated, the tile configuration module 128 may define a tile 362 that includes the text box in its entirety. Thus, only a single tile 362 is managed and re-drawn to display the update. In addition, the tile 362 has been sized to correspond to the outer perimeter of the text box, thereby reducing any background content that is unnecessarily re-drawn with the text box.

At block 210, the browser 120 can split a single tile (or portions thereof) into two or more tiles. Splitting tiles or substituting multiple tiles for smaller number of previously defined tiles can reduce the cost associated with re-drawing portions of the display to reflect changes in the visual state of content elements. For example, if multiple elements may change in appearance independently of each other, re-drawing each of the elements to reflect the changes in one element is an inefficient use of available resources, may introduce user-perceived delay, etc. The browser interfaces in FIG. 3 show an example of splitting a tile into multiple smaller tiles. Tile D2 in interface 300 includes two separate check boxes that may both be checked and unchecked independently of each other (as opposed to so-called "radio buttons" in which selection of one button typically results in de-selection of another). The updated tiling configuration shown in interface 350 includes two separate tiles 354 and 356 for the separate check boxes. Thus, when a user checks or unchecks one of the boxes, the smaller tile within which the check box is displayed is re-drawn, and the other tile within which the other check box is displayed is not re-drawn.

At block 212, the browser 120 can define irregularly-shaped tiles. Defining irregularly-shaped tiles, such as rectangular tiles with smaller rectangles excluded (e.g., forming "L"-shaped tiles, tiles with "holes," etc.), polygon meshes, and other non-rectangular tiles, can reduce the cost associated with re-drawing portions of the display to reflect changes in the visual state of content elements. For example, if an irregularly shaped element may change in appearance independently of the surrounding area, re-drawing the surrounding area that makes up the remainder of a tile to reflect the changes in the irregularly-shaped element is an inefficient use of available resources, may introduce user-perceived delay, etc. The browser interfaces in FIG. 3 show an example of defining an irregularly-shaped tile. Tiles A1, A2, and A3 in interface 300 include portions that correspond to the image tile 352 described above. Because portions of the tiles A1, A2 and A3 do not typically become damaged at the same time as the portions that correspond to the image, the tiles may be changed to exclude a rectangular portion that corresponds to the image. Thus, the irregularly-shaped portions that do not change with the image can be handled separately. In addition, because those portions of tiles A1, A2, and A3 that do not change with the image also tend not to change at all (e.g., they are the background of the content page), they can be combined into a single irregularly shaped tile 358, as shown in interface 350. Although only one such combined, irregularly-shaped background tile is shown in the interface 350, the updated browsing configuration may include other such combined and/or irregularly-shaped tiles. In addition, irregularly-shaped tiles do not need to be background tiles or tiles that do not become damaged often; dynamic tiles which become damaged often may also have irregular shapes.

At decision block 214, the browser 120 can determine whether to define separate layers for any region of the content page. Defining separate overlapping layers can provide an additional improvement in the efficient use of resources by allowing the browser 120 to keep visual representations of certain tiles in memory even though the tiles may presently be covered by other tiles. For example, if an animation, such as the animation in tile 360 of browser interface 350, oscillates between covering and uncovering a portion of a substantially static background 370 (e.g., the animation expands and contracts, such as an image of a heart beating), continuously re-drawing the portion of the substantially static background each time it is uncovered is an inefficient use of available resources, may introduce user-perceived delay, etc. By defining the tile for the animation on a separate layer than the tile for the background, the tiles can be handled separately. In some embodiments, a tile on a lower layer may be retained in memory even when it is not displayed so that it can be immediately re-displayed from memory when it is uncovered, without an expensive re-drawing operation.

At block 216, the browser 120 can determine one or more tiles for the layer. In some embodiments, the browser 120 may determine tiles using, e.g., the processes described above with respect to blocks 208, 210, and 212.

At decision block 218, the browser 120 can determine whether one or more elements or other portions of the content page are "damaged" (e.g., the representation of the element that is currently displayed does not reflect a recent change). If so, the process 200 can proceed to block 220 where the drawing module 124 or some other module or component of the browser 120 updates the tile(s) that correspond to the damaged element or portion, rather than updating the entire visual display of the content page.

In some embodiments, content may be divided into portions (e.g., cells) for measuring which video units (e.g., pixels) are affected by changes to individual elements of the content. For example, a content page can be divided into x by y pixel areas (where x and y are integers), such as 10×10 pixel cells. In some embodiments, tiles may be sized such that they are easily divisible into such cells. For example, the tiles may be sized such that they are divisible by 10 so that they can be divided into 10×10 pixel cells. Each of the cells may be assigned or associated with N integers (wherein N is an integer), such as at least two integers. One or more of the integers may be a bitmask. Content elements can be given bit identifiers, and when drawing, the bits of an integer can be set (bitwise or with assignment) for the cells affected by each corresponding element. The division of tiles into cells allows measurement of damage area and cost within a tile, and "bitwise-and" operations can be used to detect damage area boundaries/overlap from different visual elements. For example, cells that belong to two different tiles may have identical bits set. Cells next to those cells may have different bits set. This may indicate that adjusting the tiling to move some cells with identical bits from one tile into another (neighboring) tile would reduce tile redraw overhead when the cells that had differing bits get damaged. The system can therefore adjust the tile configuration for the content to incorporate the cells with identical bits into the same tile or set of tiles.

In some embodiments, a content page may not be initially processed using a default tile configuration, but may instead be rendered and drawn in full (e.g., as though there was one tile covering the entire content page). In such cases, damage history can be monitored with respect to individual elements or portions of a content page. The browser 140/402 can then use the damage history information to generate or select a tile configuration, such as a tiling configuration that separates the display into a collection of rectangular or irregularly-shaped tiles based on the damage history of each respective portion and/or the processing burden to re-draw each respective portion.

Server-Side Determination of Tiling Configurations

Figure 4:
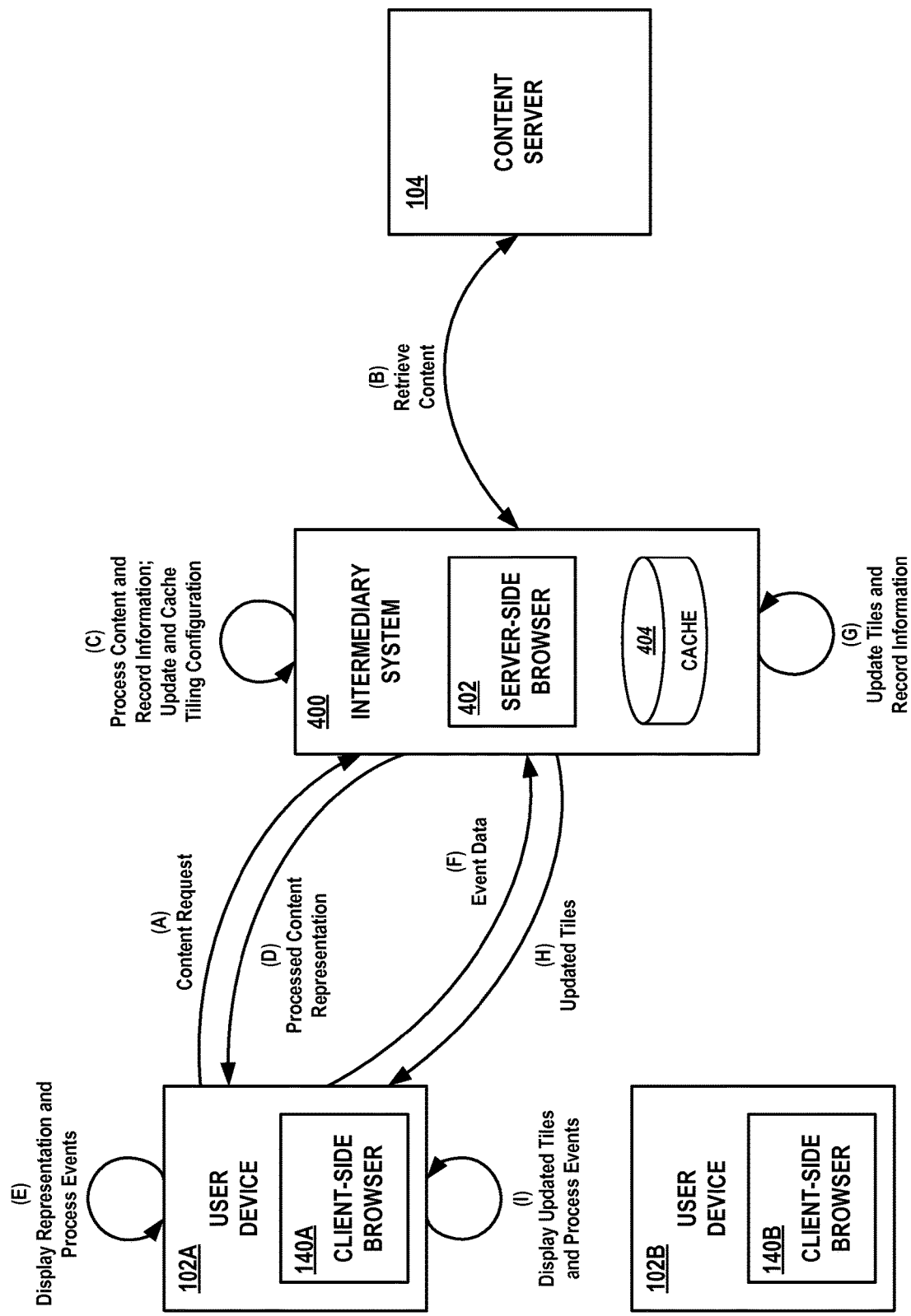
FIG. 4 illustrates example data flows and interactions between user devices, content servers, and an intermediary system implementing intelligent display tiling according to some embodiments.

FIG. 4 illustrates an example network environment in which an intermediary system 400 may execute a server-side browser application 402 to process content, analyze costs associated with re-drawing portions of the content, and determine updated content tiling configurations. The browser 402 may include some or all of the modules and data stores shown in FIG. 1 and described above with respect to the browser application 120.

The intermediary system 400 may be a single computing device, or it may include multiple distinct computing devices, such as computer servers, logically or physically grouped together to collectively operate as an intermediary system. The components of the intermediary system 400 can each be implemented as hardware, such as a server computing device, or as a combination of hardware and software. In addition, the modules and components of the intermediary system 400 can be combined on one server computing device or separated individually or into groups on several server computing devices. In some embodiments, the features and services provided by the intermediary system 400 may be implemented as web services consumable via a communication network. In further embodiments, the intermediary system 400 or server-side browser 402 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As shown, a user device 102A may include a client-side browser 140A to receive and display processed content representations from the intermediary system 400. In one example, a user may use the client side browser 140A to request content, and the request can be sent to the intermediary system 400 at (A). The intermediary system 400 can retrieve the requested content at (B) from a content server 104, and process the content at (C).

Processing the content at (C) may include, e.g., performing the process 200 described above, or some similar process. For example, the server-side browser 402 can record information about the time taken to process individual tiles or other portions of the content and/or the likelihood that the individual tiles will be updated. The server-side browser 402 can determine an updated tiling configuration based on the recorded information, as also described above. In some embodiments, the server-side browser 402 can determine an updated tiling configuration based on information recorded during content page processing performed responsive to requests from multiple different user devices, over some period of time, etc. In additional embodiments, the server-side browser 402 can cache the updated tiling configuration (or information regarding the updated tiling configuration) in a server-side cache 404. By caching the updated tiling configuration, the server-side browser 402 can later access and use the cached tiling configuration to process subsequent requests for the content page, as described below.

The server-side browser 402 may provide a processed representation of the content to the requesting user device 102A at (D). Illustratively, the processed representation may include images, executable graphics commands, RDP representations, or the like. The client-side browser 140A of the user device 102A can display the representation of the requested content item (e.g., execute the graphics commands, establish the RDP display, etc.) at (E). In addition, the client-side browser 140A can process various events, such as user interactions with the content. The client-side browser 140A can transmit data regarding any such events to the server-side browser 402 at (F). Illustratively, the client-side browser 140A may be configured to merely display representations of content generated by the server-side browser 402, and may therefore be unable to process some or all interactive user events that cause a change to a portion of the display. Instead, the client-side browser 140A can notify the server-side browser 402 of the interaction, and the server-side browser 402 can update portions of the visual representation of the content page at (G) by, e.g., re-drawing various tiles. In addition, the server-side browser 402 may record information about re-drawing the various tiles or information about other processing tasks for use in future tiling configuration determinations.

The server-side browser 402 can provide the updated tiles (or information regarding the updated tiles, such as graphics commands, RDP data, etc.) to the client-side browser 140A at (H), and the client-side browser 140A can update the display of the content item accordingly at (I). By providing only the updated tiles (or information regarding the updated tiles), the server-side browser 402 can reduce the total amount of data that is transmitted to the client-side browser 140A to update visual representations of content. Thus, the optimized or otherwise improved tiling configurations described above with respect to FIG. 2 may have an equal or greater impact in server-side browser implementations by reducing the amount of network traffic required to synchronize the updated display of content.

In some embodiments, the user device 102A may obtain content directly from the content server 104, rather than going through the intermediary system 104. In such cases, the user device 102A may obtain, from a third-party system, data regarding optimized, improved, or updated tiling configurations for requested or received content. For example, the user device 102A can obtain tile configuration information from a system which performs many of the functions described with respect to the intermediary system 400, but which does not necessarily function as a proxy or intermediary.

Figure 5:
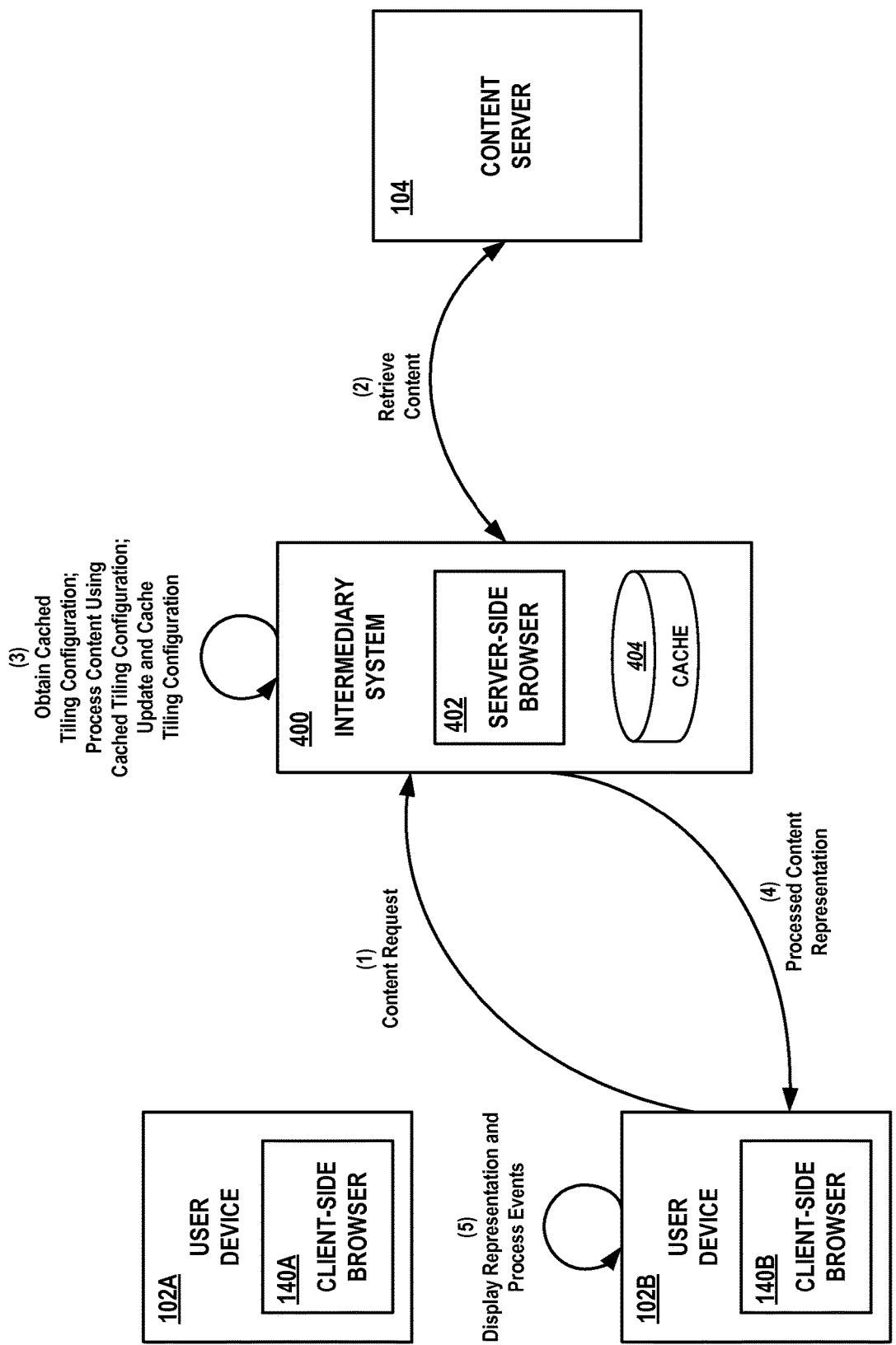
FIG. 5 illustrates example data flows and interactions between user devices, content servers, and an intermediary system implementing intelligent display tiling based on previously-determined information according to some embodiments.

FIG. 5 illustrates additional data flows and interactions between user devices, an intermediary system, and content servers. The interactions shown and described illustrate the use of cached tiling configuration information to process content page requests, such as content page requests occurring subsequent to the interactions shown in FIG. 4 and originating from different user devices.

As shown, a client-side browser application 140B executing on a different user device 102B may cause transmission of a request for a content page at (1). The requested content page may be the same content page requested by the user device 102A. The server-side browser 402 can retrieve the requested content from one or more content servers 104 at (2), and can obtain tile configuration information for the content page from the server-side cache 404 at (3). By using cached tile configuration information to process the content page, the server-side browser 402 can avoid the preliminary step of processing the content according to a default tiling configuration, as described above with respect to FIG. 2. Instead, the server-side browser 402 can leverage the previously determined and improved tiling configuration, and may proceed to record cost information and update the tiling configuration further. The server-side browser 402 may cache the updated tiling configuration for future use, and the process may be repeated over the course of many different requests, from many different user devices 102, etc.

The server-side browser 402 can provide a processed representation of the requested content page to the requesting user device 102B at (4). The client-side browser 140B on the user device 102B can cause display of the processed content representation and process content-related events at (5), as described above.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the process 200 described with respect to FIG. 2 may be embodied in a set of executable program instructions stored on one or more non-transitory computer-readable media, such as one or more disk drives or solid-state memory devices, of a user device 102, intermediary system 400, or some other computing system. When the process 200 is initiated, the executable program instructions can be loaded into memory, such as RAM, and executed by one or more processors of the user device 102 or intermediary system 400. In some embodiments, the computing system executing the process 200 may include multiple individual processors or separate computing devices, and the process 200 or portions thereof may be executed by separate processors or computing devices, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising computer-readable storage and one or more computer processors, wherein the system is configured to at least:
    retrieve a content page from a content server;
    process the content page for display at least in part by
        dividing a visible portion of the content page into a plurality of tiles according to a default tile configuration;
    determine a processing burden to update individual tiles of the plurality of tiles based at least partly on an amount of time taken to redraw the individual tiles after the individual tiles are determined to be damaged;
    determine a change likelihood regarding a likelihood that visual representations of the individual tiles will be redrawn during display of the content page, wherein the change likelihood is determined based at least partly on a frequency of redrawing operations for the visual representations of the individual tiles observed as occurring during display of the content page on one or more client devices;
    determine an updated tile configuration for the content page based at least partly on the processing burdens and change likelihoods determined for the individual tiles defined according to the default tile configuration, wherein a processing burden to update a display of a first tile defined according to the updated tile configuration and comprising a particular portion of the content page is less than a processing burden to update a display of a first tile defined according to the default tile configuration and also comprising the particular portion of the content page; and
    generate, in response to a request for the content page, a processed representation of the content page based at least partly on the updated tile configuration.

2. The system of claim 1, wherein the first tile defined according to the updated tile configuration excludes at least a portion of the content page included in the first tile defined according to the default tile configuration.

3. The system of claim 1, further configured to at least determine the updated tile configuration using a machine learning model trained on processing burden and change likelihood information generated in connection with processing a plurality of different content pages.

4. A computer-implemented method comprising:
    as implemented by one or more computing devices configured to execute specific instructions,
    monitoring damage history for individual portions of a plurality of portions of a content page, wherein an individual portion of the plurality of portions is determined to be damaged based at least partly on a redrawing operation for a visual representation of the individual portion being performed during display of the content page on a user computing device;
    determining, using the damage history, a likelihood that a future redrawing operation for the individual portion will be performed during display of the content page, wherein the likelihood is based at least partly on an amount of past redrawing operations performed for the individual portion during display of the content page;
    determining a processing burden to update one or more portions of the plurality of portions, wherein the processing burden is determined based at least partly on an amount of time taken to redraw the one or more portions after the one or more portions are determined to be damaged;
    determining a tile configuration for the content page based at least partly on the likelihood and the processing burden, wherein the tile configuration separates the content page into a plurality of tiles, and wherein a visual representation of each tile of the plurality of tiles is updated independently of each other tile of the plurality of tiles;
    receiving a request for the content page; and
    generating the plurality of tiles using the tile configuration.

5. The computer-implemented method of claim 4, wherein the method is implemented in its entirety by a single user computing device.

6. The computer-implemented method of claim 4, wherein the method is implemented in its entirety by a server system configured to act as an intermediary between user devices and content servers.

7. The computer-implemented method of claim 4, further comprising using cached information regarding the tile configuration to process the content item responsive to requests from a plurality of different user computing devices.

8. The computer-implemented method of claim 4, wherein monitoring the damage history for a first portion of the plurality of portions comprises separating the first portion into a plurality of sub-portions and monitoring damage history for each of the sub-portions.

9. The computer-implemented method of claim 4, wherein determining a tile configuration comprises defining a tile corresponding to multiple portions of the plurality of portions, and wherein the multiple portions are determined, based at least partly on the damage history, to be likely to become damaged as a group.

10. The computer-implemented method of claim 4, wherein determining a tile configuration comprises defining a tile corresponding to multiple portions of the plurality of portions, and wherein the multiple portions are determined, based at least partly on the damage history, to be unlikely to become damaged.

11. The computer-implemented method of claim 4, further comprising determining a measurement of a resource used to redraw a portion of the content page, wherein the resource comprises at least one of: processor cycles used, memory used, or time elapsed.

12. The computer-implemented method of claim 4, wherein determining the likelihood comprises determining a frequency with which redrawing operations associated with the individual tile are performed during display of the content page.

13. A system comprising:
non-transitory computer-readable memory storing executable instructions; and
one or more processors in communication with the non-transitory computer-readable memory and programmed by the executable instructions to at least:
monitor damage history for individual portions of a plurality of portions of a content page, wherein an individual portion of the plurality of portions is determined to be damaged based at least partly on a redrawing operation for a visual representation of the individual portion being performed during display of the content page on a user computing device;
determine, using the damage history, a likelihood that a future redrawing operation for the individual portion will be performed during display of the content page, wherein the likelihood is based at least partly on an amount of past redrawing operations performed for the individual portion during display of the content page;
determine a processing burden to update one or more portions of the plurality of portions, wherein the processing burden is determined based at least partly on an amount of time to redraw the one or more portions after the one or more portions are determined to be damaged;
determine a tile configuration for the content page based at least partly on the likelihood and the processing burden, wherein the tile configuration separates the content page into a plurality of tiles, and wherein a visual representation of a tile of the plurality of tiles is updated independently of each other tile of the plurality of tiles;
receive a request for the content page; and
generate the plurality of tiles using the tile configuration.

14. The system of claim 13, wherein the one or more processors comprise one or more processors of a user computing device.

15. The system of claim 13, wherein the one or more processors comprise one or more processors of a server system configured to act as an intermediary between user devices and content servers.

16. The system of claim 13, wherein the one or more processors are further programmed by the executable instructions to at least use cached information regarding the tile configuration to process the content item responsive to requests from a plurality of different user computing devices.

17. The system of claim 13, wherein the executable instructions to determine a tile configuration comprise executable instructions to at least define a tile corresponding to multiple portions of the plurality of portions, wherein the multiple portions are determined, based at least partly on the damage history, to be likely to become damaged as a group.

18. The system of claim 13, wherein the executable instructions to determine a tile configuration comprise executable instructions to at least define a tile corresponding to multiple portions of the plurality of portions, wherein the multiple portions are determined, based at least partly on the damage history, to be unlikely to become damaged.

19. The system of claim 13, wherein the executable instructions to determine the tile configuration for the content page comprise executable instructions to define one or more non-rectangular tiles, and wherein a previous tile configuration for the content page comprises exclusively rectangular tiles.

20. The system of claim 13, wherein the likelihood is determined based at least partly on a type of a content element present in the individual tile.

* * * * *